United States Patent [19]
Burnett et al.

[11] Patent Number: 5,633,869
[45] Date of Patent: May 27, 1997

[54] VIRTUAL NETWORK USING ASYNCHRONOUS TRANSFER MODE

[75] Inventors: John L. Burnett, Cupertino; Peter Newman, Mountain View, both of Calif.

[73] Assignee: Network Equipment Technologies, Inc., Redwood City, Calif.

[21] Appl. No.: 450,612

[22] Filed: May 25, 1995

Related U.S. Application Data

[63] Continuation of Ser. No. 944,682, Sep. 14, 1992, Pat. No. 5,444,702.

[51] Int. Cl.[6] .............................. H04L 12/56; H04L 12/44
[52] U.S. Cl. ........................... 370/396; 370/410; 370/465
[58] Field of Search ................................ 370/56, 60, 60.1, 370/79, 82, 85.3, 85.13, 85.14, 92, 94.1, 94.3; 340/825.52

[56] References Cited

U.S. PATENT DOCUMENTS

| | | | |
|---|---|---|---|
| 5,067,123 | 11/1991 | Hyodo et al. | 370/58.1 |
| 5,101,404 | 3/1992 | Kunimoto et al. | 370/60.1 |
| 5,140,585 | 8/1992 | Tomikawa | 370/60.1 |
| 5,280,476 | 1/1994 | Kojima et al. | 370/60.1 |
| 5,408,469 | 4/1995 | Opher et al. | 370/60 |
| 5,420,858 | 5/1995 | Marshall et al. | 370/79 |
| 5,450,399 | 9/1995 | Sugita | 370/85.13 |

*Primary Examiner*—Douglas W. Olms
*Assistant Examiner*—Chau T. Nguyen
*Attorney, Agent, or Firm*—David E. Lovejoy

[57] ABSTRACT

Asynchronous Transfer Mode Local Area Network (ATM LAN). The ATM LAN is implemented as a set of MAC entities which share a common group address space for the purposes of establishing multicast connections. Each station has one or more ATM MAC entities per physical connection to an ATM network. The network ATM LAN service provides the station with ATM LAN configuration information needed for ATM MAC operation. Included in this information is the number of ATM LANs the network has configured for that station.

34 Claims, 6 Drawing Sheets

VIRTUAL NETWORK USING ASYNCHRONOUS TRANSFER MODE

This application is a continuation of Ser. No. 07/944,682 filed Sep. 14, 1992 now U.S. Pat. No. 5,444,702.

CROSS-REFERENCE TO RELATED APPLICATIONS

Title: METHOD AND APPARATUS FOR REACTIVE CONGESTION CONTROL IN AN ASYNCHRONOUS TRANSFER MODE (ATM) NETWORK Inventors: Willie T. Glover, Gururaj Singh, Amar Gupta, Peter Newman and Clifford James Buckley Ser. No.: 07/756,462; U.S. Pat. No. 5,170,142

Filed: Sep. 9, 1991

Title: CONCURRENT MULTI-CHANNEL SEGMENTATION AND REASSEMBLY PROCESSORS FOR ASYNCHRONOUS TRANSFER MODE (ATM)

Inventors: Willie T. Glover, Gururaj Singh, Amar Gupta, Peter Newman and Clifford James Buckley Ser. No.: 07/866,317

Filed: Apr. 9, 1992

U.S. Pat. No. 5,379,297

BACKGROUND OF THE INVENTION

The present invention relates to networks and particularly to networks of computers that communicate data and other information.

Wide Area Networks

With the increased bandwidth available through transmission channels, for example increases from T1 to T3, and with the increase in bandwidth provided by broadband services such as SONET, larger enterprises are evaluating new applications which require higher speed communications. These new applications will dramatically enhance business productivity, but will require vastly improved network control and management facilities. However, neither private networks nor common carriers have fully addressed the emerging needs of the new communication environment.

Computer Networks

In the computer field, in order for users to have access to more information and to greater resources than those available on a single computer, computers are connected through networks.

In a computer network, computers are separated by distance where the magnitude of the distance has a significant bearing on the nature of communication between computers. The distance can be short, for example, within the same computer housing (internal bus), can be somewhat longer, for example, extending outside the computer housing but within several meters (external bus), can be local, for example, within several hundred meters (local area networks, LANs), within tens of miles (metropolitan area networks, MANs) or can be over long distances, for example, among different cities or different continents (wide area networks, WANs).

Multi-Layer Communication Architecture

For networks, the communication facilities are viewed as a group of layers, where each layer in the group is adapted to interface with one or more adjacent layers in the group. Each layer is responsible for some aspect of the intended communication. The number of layers and the functions of the layers differ from network to network. Each layer offers services to the adjacent layers while isolating those adjacent layers from the details of implementing those services. An interlayer interface exists between each pair of adjacent layers. The interlayer interface defines which operations and services a layer offers to the adjacent layer. Each layer performs a collection of well-defined functions.

Many multi-layered communication architectures exist including Digital Equipment's Digital Network Architecture (DNA), IBM's System Network Architecture (SNA) and the International Standards Organization (ISO) Open System Interface (OSI).

The ISO architecture is representative of multi-level architectures and consists of a 7-layer OSI model having a physical link layer, a data link layer, a network layer, a transport layer, a session layer, a presentation layer, and an application layer.

In the OSI model, the physical layer is for standardizing network connectors and the electrical properties required to transmit binary 1's and 0's as a bit stream. The data link layer breaks the raw bit stream into discrete units and exchanges these units using a data link protocol. The network layer performs routing. The transport layer provides reliable, end-to-end connections to the higher layers. The session layer enhances the transport layer by adding facilities to help recover from crashes and other problems. The presentation layer standardizes the way data structures are described and represented. The application layer includes protocol handling needed for file transfer, electronic mail, virtual terminal, network management and other applications.

In the n-layer multi-layer models, layers 1, 2, ..., n are assumed to exist in each host computer. Layers 1, 2, ..., n in one host computer appear to communicate with peer layers 1, 2, ..., n, respectively, in another host computer. Specifically, layer 1 appears to communicate with layer 1, layer 2 appears to communicate with layer 2 and so on with layer n appearing to communicate with layer n. The rules and conventions used in communications between the peer layers are collectively known as the peer level protocols. Each layer executes processes unique to that layer and the peer processes in one layer on one computer station appear to communicate with corresponding peer processes in the same layer of another computer station using the peer protocol.

Although peer layers appear to communicate directly, typically, no data is directly transferred from layer n on one computer station to layer n on another computer station. Instead, each layer n passes data and control information to the n−1 layer immediately below it in the same computer station, until the lowest layer in that computer is reached. The physical medium through which actual communication occurs from one computer station to another exists below the top layer n and typically below the bottom layer 1.

In order to provide communication to the top layer n of an n-layer network, a message, M, is produced by a process running in a top layer n of a source computer station. The message is passed from layer n to layer n−1 according to the definition of the layer n/n−1 interface. In one example where n equals 7, layer 6 transforms the message (for example, by text compression), and then passes the new message, M, to the n−2 layer 5 across the layer 5/6 interface. Layer 5, in the 7 layer example, does not modify the message but simply regulates the direction of flow (that is, prevents an incoming message from being handed to layer 6 while layer 6 is busy handing a series of outgoing messages to layer 5).

In many networks, there is no limit to the size of messages accepted by layer 4, but there is a limit imposed by layer 3. Consequently, layer 4 must break up the incoming messages into smaller units, prefixing a header to each unit. The header includes control information, such as sequence numbers, to allow layer 4 on the destination computer to put the pieces back together in the right order if the lower layers do not maintain sequence. In many layers, headers also contain sizes, times and other control fields.

Layer 3 decides which of the outgoing lines to use, attaches its own headers, and passes the data to layer 2. Layer 2 adds not only a header to each piece, but also a trailer, and gives the resulting unit to layer 1 for physical transmission. At the destination computer, the message moves upward, from lower layer 1 to the upper layers, with headers being stripped off as it progresses. None of the headers for layers below n are passed up to layer n.

Virtual Peer To Peer Communication

An important distinction exists between the virtual and actual communication and between protocols and interfaces. The peer processes in source layer 4 and the destination layer 4, for example, interpret their layer 4 communication as being "direct" using the layer 4 protocol without recognition that the actual communication transcends down source layers 3, 2, 1 across the physical medium and thereafter up destination layers 1, 2, and 3 before arriving at destination layer 4.

The virtual peer process abstraction assumes a model in which each computer station retains control over its domain and its communication facilities within that domain.

Communication Networks Generally

For more than a century, the primary international communication system has been the telephone system originally designed for analog voice transmission. The telephone system (the public switched network) is a circuit switching network because a physical connection is reserved all the way from end to end throughout the duration of a call over the network. The telephone system originally sent all its control information in the 4 kHz voice channel using in-band signaling.

To eliminate problems caused by in-band signaling, in 1976 AT&T installed a packet switching network separate from the main public switched network. This network, called Common Channel Interoffice Signaling (CCIS), runs at 2.4 kbps and was designed to move the signaling traffic out-of-band. With CCIS, when an end office needed to set up a call, it chose a channel on an outgoing trunk of the public switched network. Then it sent a packet on the CCIS network to the next switching office along the chosen route telling which channel had been allocated. The next switching office acting as a CCIS node then chose the next outgoing trunk channel, and reported it on the CCIS network. Thus, the management of the analog connections was done on a separate packet switched network to which the users had no access.

The current telephone system has three distinct components, namely, the analog public switched network primarily for voice, CCIS for controlling the voice network, and packet switching networks for data.

Future Communication Networks-ISDN

User demands for improved communication services have led to an international undertaking to replace a major portion of the worldwide telephone system with an advanced digital system by the early part of the twenty-first century. This new system, called ISDN (Integrated Services Digital Network), has as its primary goal the integration of voice and nonvoice services.

The investment in the current telephone system is so great that ISDN can only be phased in over a period of decades and will necessarily coexist with the present analog system for many years and may be obsolete before completed.

In terms of the OSI model, ISDN will provide a physical layer onto which layers 2 through 7 of the OSI model can be built.

Telephone Network Domains

In a telephone network, the system architecture from the perspective of the telephone network is viewed predominantly as a single domain. When communication between two or more callers (whether people or computers) is to occur, the telephone network operates as a single physical layer domain.

Communication Network Architectures

Most wide area networks have a collection of end-users communicating via a subnet where the subnet may utilize multiple point-to-point lines between its nodes or a single common broadcast channel.

In point-to-point channels, the network contains numerous cables or leased telephone lines, each one connecting a pair of nodes. If two nodes that do not share a cable are to communicate, they do so indirectly via other nodes. When a message (packet), is sent from one node to another via one or more intermediate nodes, the packet is received at each intermediate node in its entirety, stored there until the required output line is free, and then forwarded. In broadcast channels, a single communication channel is shared by all the computer stations on the network. Packets sent by any computer station are received by all the others. An address field within the packet specifies the intended one or more computer stations. Upon receiving a packet, a computer station checks the address field and if the packet is intended only for some other computer station, it is ignored.

Most local area networks use connectionless protocols using shared medium where, for example, all destination and source information is included in each packet and every packet is routed autonomously with no prior knowledge of the connection required.

In the above-identified application CONCURRENT MULTI-CHANNEL SEGMENTATION AND REASSEMBLY PROCESSORS FOR ASYNCHRONOUS TRANSFER MODE (ATM) an apparatus for concurrently processing packets in an asynchronous transfer mode (ATM) network is described. Packets that are to be transmitted are segmented into a plurality of cells, concurrently for a plurality of channels, and the cells are transmitted over an asynchronous transfer mode (ATM) channel. Cells received from the asysnchronous transfer mode (ATM) channel are reassembled into packets concurrently for the plurality of channels.

Accordingly, there is a need for new networks which satisfy the emerging new requirements and which provide broadband circuit switching, fast packet switching, and intelligent network attachments.

SUMMARY OF INVENTION

The present invention is an Asynchronous Transfer Mode Local Area Network (ATM LAN). The ATM LAN is implemented as a set of MAC entities which share a common group address space for the purposes of establishing multicast connections. Each station has one or more ATM MAC entities per physical connection to an ATM network. The network ATM LAN service provides the station with ATM LAN configuration information needed for ATM MAC operation. Included in this information is the number of ATM LANs the network has configured for that station.

In the present invention, a communication system includes an ATM network. The ATM network has a plurality of ports, each port having a unique port address. The ATM network includes one or more ATM switches for connecting sending ports to receiving ports.

The communication system includes a plurality of stations, each station having a unique station address distinguishing the station from other stations. Each station is connected to the ATM network at a port whereby source stations communicate with destination stations. Each station provides packets for transferring information, information including a destination station address, for addressing destination stations. Each station includes a packet converter for converting between packets and cells for transfers between stations.

The communication system provides address resolution for determining a port address corresponding to a destination station address. The address resolution includes multicast for multicasting the destination station address to a group of stations.

The communication system provides management for requesting connections through the ATM network connecting sending ports to receiving ports whereby packets are transferred from source stations to destination stations by cell transfers through ATM network.

ATM LANs may are extended by bridging several ATM LANs together using transparent MAC bridges and routers.

Permanent virtual connections or switched virtual connections may underlie the layer management.

The communication system operates with a multi-level architecture, such as the ISO architecture, and Logical Link Control (LLC), Media Access Control (MAC) and addressing functions are performed for ATM LANs. An ATM LAN provides support for the LLC sublayer by means of a connectionless MAC sublayer service in a manner consistent with other IEEE 802 local and metropolitan area networks. The ATM LAN interface is built on the user-to-network interface for ATM and adaptation layers.

The communication system including the ATM LAN provides the following benefits:

Physical plug-in locations can be moved and changed without changing logical locations.

The stations in the communication system are partitionable into multiple work groups.

The communication system provides high bandwidth that supports multimedia applications including voice, video, real-time and time-sensitive applications.

The communication system integrates Wide Area Networks (WAN) and Local Area Networks (LAN) into one system.

The foregoing and other objects, features and advantages of the invention will be apparent from the following detailed description in conjunction with the drawings.

DETAILED DESCRIPTION

Figure 1:
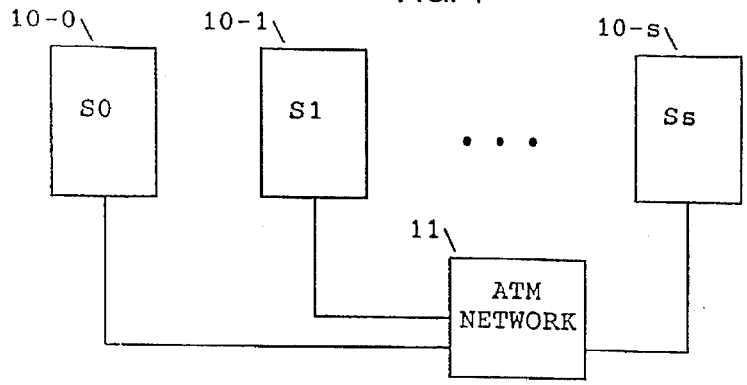
FIG. 1 depicts a number of user stations connected together in an ATM network system.

In FIG. 1, an ATM network system is shown in which two or more computer stations 10 are interconnected by an ATM network 11 for network communication. The stations 10 include the station S0, S1, . . . Ss designated 10-0, 10-1, . . . , 10-s. The ATM network system of FIG. 1 employs, for example, the top six of the seven OSI model layers. The OSI model physical layer 1 is replaced with a ATM interface which operates in an asynchronous transfer mode (ATM) in accordance with the B-ISDN protocol.

Figure 2:
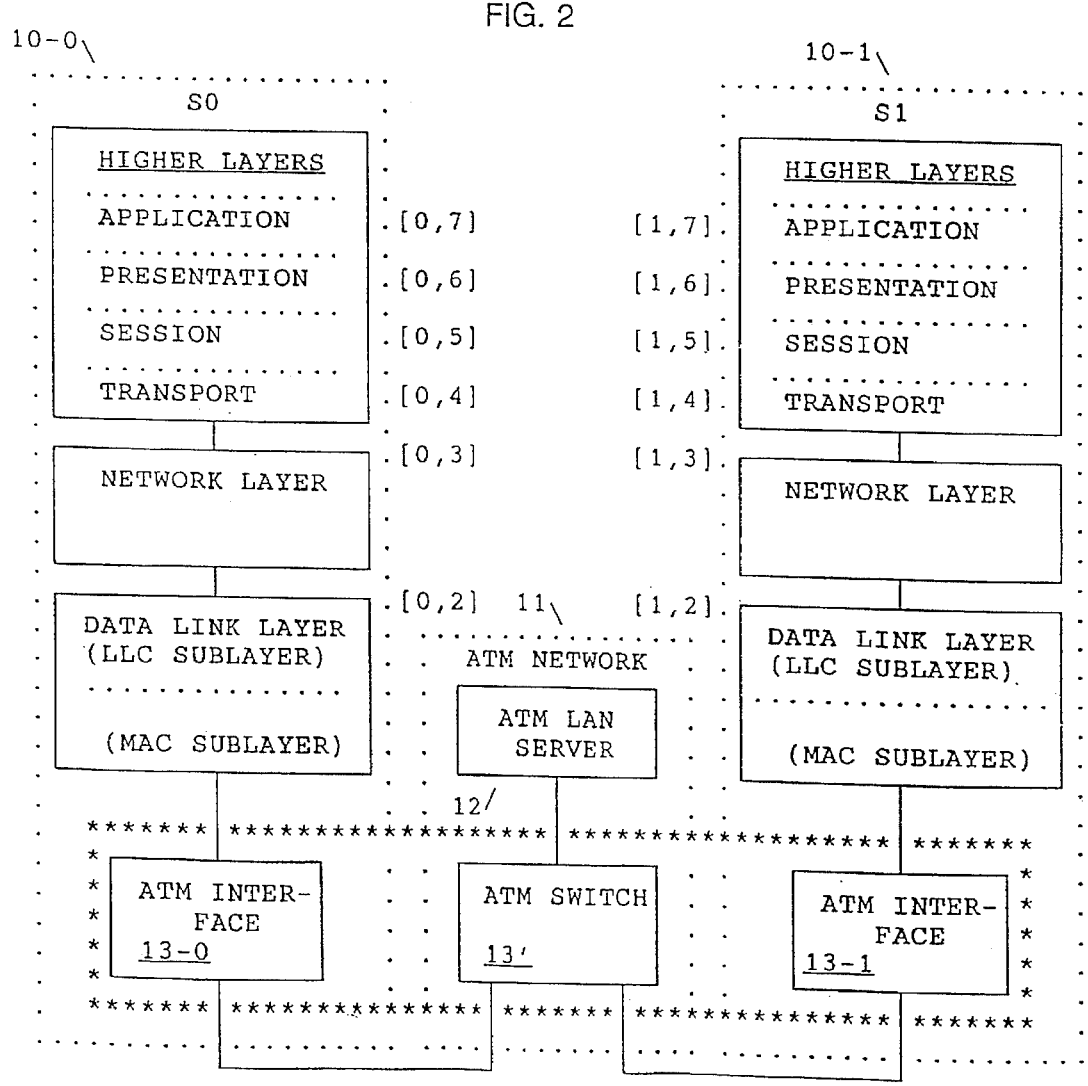
FIG. 2 depicts the multi-level protocol used to connect two or more stations in the ATM network system of FIG. 1.

In FIG. 2, the ATM network 11 connects, by way of example, the S0 station 10-0 to the S1 station 10-1. The S0 station 10-0 includes the top six OSI layers, namely, the application layer [0, 7], the presentation layer [0, 6], the session layer [0,5] and the transport layer [0,4]. The layers 7 through 4 in FIG. 2 are designated as the higher layers and operate in the conventional manner for the OSI model.

In FIG. 2, the S0 station 10-0 includes the network layer [0,3] and the data link layer, [0, 2]. The data link layer [0,2] includes the logical link control (LLC) sublayer and the media access control (MAC) sublayer. The MAC sublayer in the data link layer [0, 2] connects to a ATM interface 13-0. The ATM interface 13-0 operates in accordance with the B-ISDN protocol defined by the CCITT.

In FIG. 2, the S1 station 10-1 has the higher layers including the application layer [1,7], the presentation layer [1,6], the session layer [1,5] and the transport layer [1,4]. The S1 station 10-1 also includes the network layer [1,3] and the data link layer [1,2] that connects to the ATM interface 13-1. In FIG. 2, the ATM interface 13-0 for the S0 station 10-0 and the ATM interface 13-1 for the S1 station 10-1 connect to a ATM switch 13' in the ATM network 11. The ATM interfaces 13-0 and 13-1 and ATM switch 13' operate in accordance with an ATM architecture for ATM communication. The ATM LAN communication is under control of an ATM LAN server 12 in the ATM network 11.

In FIG. 2 each of the higher layers in the S0 station 10-0 and in the S1 station 10-1 function in a well known manner in accordance with the OSI model. Also, the network layer [0, 3] in the S0 station 10-0 and the network layer [1, 3] in the S1 station 10-1 conform to the model OSI The data link layer [0,2] in the S0 station 10-0 and the data link layer [1,2] in the S1 station 10-1 have OSI compatibility. The compatibility with the OSI model at the data link layer enables the ATM network system of FIGS. 1 and 2 to be compatible with other local area networks and other networks that conform to the OSI model from layer [2] and above. Below the OSI layer [2], the communication and connections are compatible with the B-ISDN model of the CCITT.

The FIG. 2 communication network system is a hybrid of the OSI model above layer [1] and asynchronous transfer mode below the data link layer [2].

Figure 3:
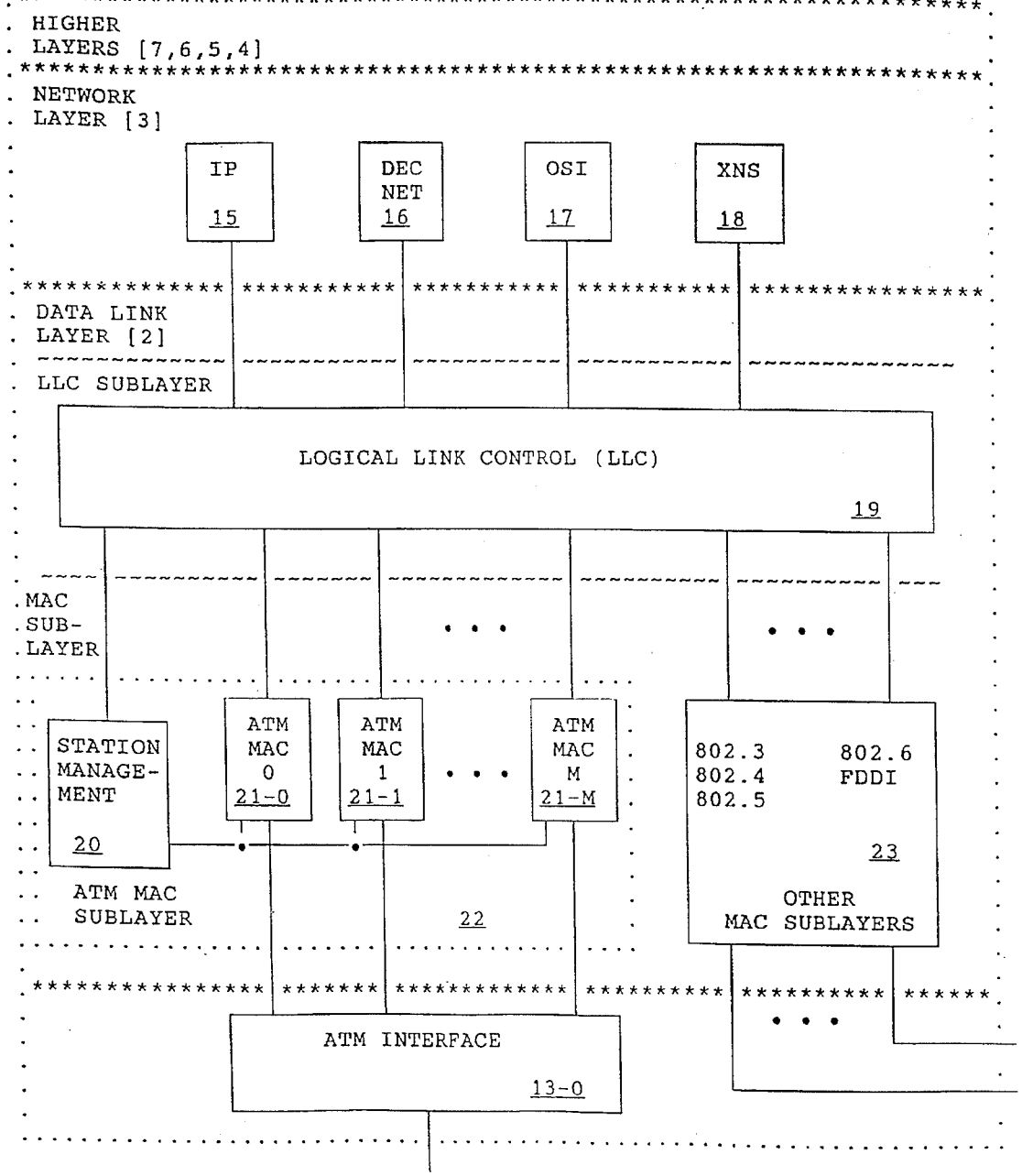
FIG. 3 depicts the network layer and the data link layer connected to a ATM interface in the ATM network system of FIGS. 1 and 2.

In FIG. 3, further details of the S0 station 10-0 are shown and are typical of all of the other stations 10-1 . . . , 10-s of FIG. 1. In FIG. 3, the higher layers 7, 6, 5 and 4 are conventional. Typically the higher layers of the station 10-0 of FIG. 3 are implemented on a processor such as a Sun Workstation.

In FIG. 3, the network layer [3] uses any one of a number of standard protocols such as the IP protocol 15, the DEC NET protocol 16, the OSI protocol 17 or the XNS protocol 18. Any other protocol can be implemented in the network layer 3.

In FIG. 3, the data link layer [2] includes the LLC sublayer and the MAC sublayer. The LLC sublayer includes the Logical Link Control (LLC) 19 which is conventional in the data link layer of the OSI model.

The data link layer [2] also includes the MAC sublayer which as a component of the data link layer [2]. The MAC sublayer typically may include other MAC sublayers in accordance with the standards IEEE 802.3, 802.4, 802.5, 802.6 and FDDI. ATM LANs are, therefore, capable of interoperating with a wide variety of media. ATM LANs interoperate with all IEEE 802 Local Area Networks and Metropolitan Area Networks using transparent bridges and routers. Stations connected to ATM LANs communicate with stations connected to any IEEE 802 LAN or MAN via a bridge.

In accordance with the present invention, the data link layer [2] also includes a new ATM MAC sublayer 22 analogous to the other MAC sublayers 23. The ATM MAC sublayer 22 differs from the other MAC sublayers 23 in that the ATM MAC sublayer 22 communicates with the ATM switch 13 for ATM communication.

In FIG. 3, the ATM MAC sublayer 22 includes one or more ATM MACs including, for example, ATM MAC 0, ATM MAC 1, . . . , ATM MAC M designated 21-0, 21-1, . . . , 21-M respectively. Each of ATM MACs 21-0, 21-1, . . . , 21-m defines an ATM local area network (ATM LAN). The ATM MACs of the ATM MAC sublayer 22 connect between the logical link control 19 and the ATM interface 13-0. The control of which of the stations (like the stations 10-0, 10-1, . . . , 10-s) are serviced by particular ones of the ATM MACs 21 of FIG. 3 is determined by the station management 20 within the ATMMAC sublayer 22. Other stations (or the same stations) may also be serviced by other local area networks such as Ethernet under control of the other MAC sublayers 23.

In FIG. 3, the ATM MAC sublayer is capable of servicing the communication requirements of the stations 10-0 through 10-s of FIG. 1 in one or more ATM LANs. Stations can be switched from one ATM LAN to another ATM LAN under control of station management 20 without requirement of modifying the physical connection to the station. For this reason, the ATM LANs are virtual LANs.

Figure 4:
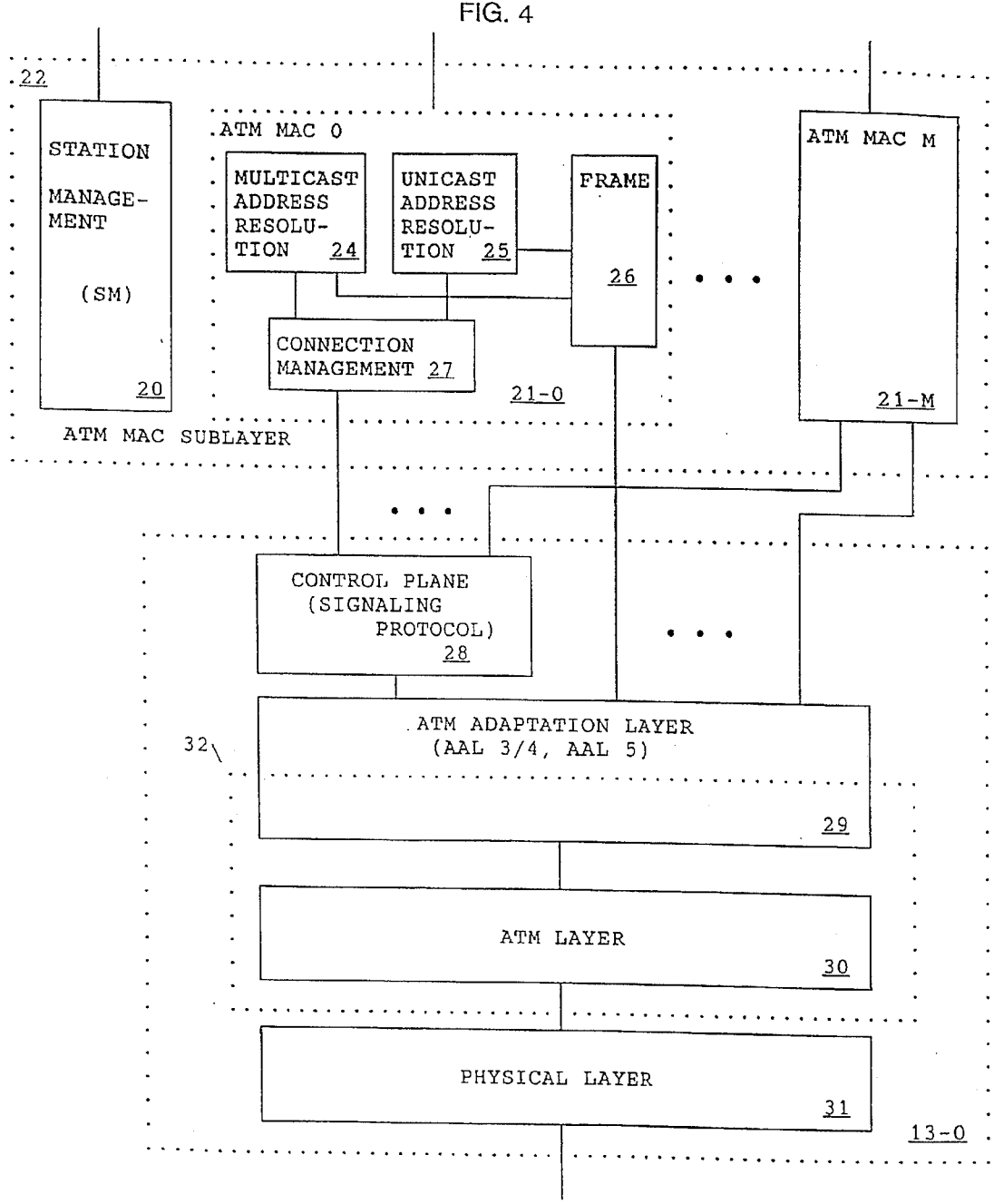
FIG. 4 depicts details of the ATM MAC sublayer and the ATM interface for stations of FIGS. 1 and 2.
Figure 5:
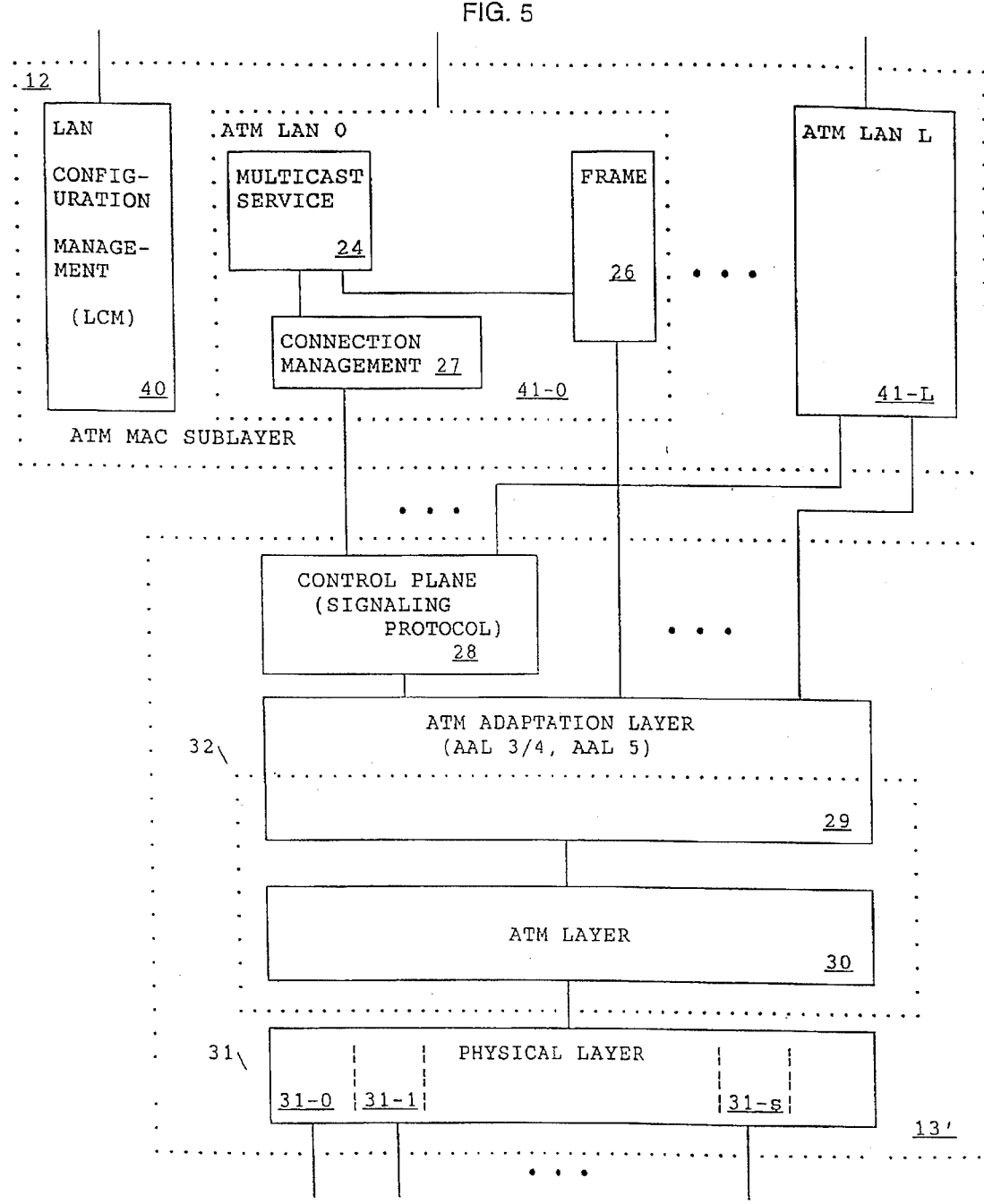
FIG. 5 depicts details of the ATM LAN Server and the ATM interfaces of the network of FIGS. 1 and 2.

In FIG. 4, further details of the ATMMAC sublayer 22 and the ATM interface 13-0 of FIG. 3 are shown.

In FIG. 4 the ATM MAC sublayer includes the station management 20 and the ATM MACs including the ATM MAC 0, . . . , ATM MAC M designated as 21-0, . . . , 21-M.

In FIG. 4, the ATM MAC 0 includes the multicast address resolution 24, the unicast address resolution 25, the frame 26 and the connection management 27.

In FIG. 4, the ATM interface 13-0 includes the signaling protocol 28 in the control plane, the ATM ADAPTATION LAYER (AAL) 29, the ATM layer 30 and the physical layer 31.

1 ATM LANs 1.1 Introduction

In FIG. 3, the higher layers [7,6,5,5] and [3] are conventional while the data link layer [2] includes the LLC sublayer and the ATM MAC sublayer to implement the Asynchronous Transfer Mode Local Area Networks (ATM LANs). Such an implementation is provided with newly defined Media Access Control (MAC) including addressing protocols. The ATM LAN provides support for the LLC sublayer by means of connectionless MAC sublayer service in a manner consistent with other IEEE 802 local area networks (LAN) and metropolitan area networks (MAN). The ATM LAN interface is built on the user-to-network interface for the ATM layer and the ATM adaptation layer (AAL).

An ATM LAN includes a set of MAC entities which share a common group address space for the purposes of establishing multicast connections. Each station has one or more ATM MAC entities per physical connection to an ATM network. The network ATM LAN service provides the station with ATM LAN configuration information needed for ATM MAC operation. Included in this information is the number of ATM LANs the network has configured for that station.

The user-to-network interface at the LLC and MAC levels is defined for the ATM LAN Architecture in a manner analogous to other Data Link Layer architectures.

1.3 ATM LAN Functionality

An ATM LAN has the following characteristics:

| | |
|---|---|
| addressing- | all LANs connected by MAC bridges use 48 bit addressing |
| unicast- | all stations can send frames to any other station in the LAN |
| duplication- | frames are not duplicated |
| broadcast- | all stations can broadcast to every other station in a LAN |
| multicast- | any station can send to any group address and any station can register to receive frames for any group address |
| promiscuity- | any station may chose to receive all frames with group destination addresses |

1.4 ATM LANs

An ATM LAN is a local network having a set of stations which share a common group address space for the purpose of establishing multicast connections. An ATM LAN is implemented using services of ATM LAN MAC, ATM signaling and ATM Adaptation Layers. Stations may participate in more than one ATM LAN. ATM LANs may be bridged together using MAC bridges.

ATM LANs are sometimes called Virtual LANs because they are not limited by the limitations of any physical media characteristics. A single underlying ATM network may support many ATM LANs. A station with a single ATM interface may be connected to many separate ATM LANs. There are no inherent limitations in the ATM LAN protocol itself to restrict either the physical extent or the number of stations in a particular ATM LAN. Practical limitations, such as multicast traffic, usually limit the size and scope of ATM LANs.

ATM LANs interoperate with a wide variety of media. ATM LANs can interoperate with all IEEE 802 Local Area Networks and Metropolitan Area Networks using transparent bridges and routers. Stations connected to ATM LANs are able to communicate with stations connected to any IEEE 802 LAN/MAN connected via bridge.

2 ATM LAN Architecture

2.1 Overview

An ATM LAN includes a set of procedures and protocols which work together to provide the services found in IEEE 802 LANs. The AAL and ATM protocols defined by CCITT are augmented by the ATM LAN MAC layer which maps unacknowledged MAC PDUs (MAC Protocol Data Units) onto unacknowledged AAL PDUs transmitted over virtual connections provided by the ATM physical layer. The ATM MAC manages connections using an ATM signaling protocol.

2.2 Logical Link Control

Stations must comply with 802.2 Type I specification which is defined by ISO 8802. This includes mandatory response to XID (Exchange ID) and Test commands.

When SNAP encapsulations are defined for upper layer protocols they are used.

2.3 Station ATM LAN MAC

Each station has one ATM LAN module per physical ATM interface. Each ATM LAN module provides MAC services via one or more ATM MAC entities. The ATM LAN server provides the ATM LAN MAC with configuration parameters.

2.3.1 ATM MAC Functions
The ATM MAC layer provides the following functions:

| | |
|---|---|
| ATM LAN Configuration- | determines the number of ATM LANs which have been configured for the station and the operational parameters needed to establish multicast connections for each ATM LAN. |
| MAC PDU Framing- | MAC SDUs (Service Data Units) are encapsulated in an AAL specific framing. |
| Address Resolution- | IEEE 802. 48 bit MAC addresses are mapped onto E.164 ATM addresses. |
| Connection Management- | establishes and releases virtual connections for transmission of MAC PDUs (Protocol Data Units) and reception of frames addressed to registered group (multicast) addresses. |
| Multicast Service- | protocol and procedures are defined for transmission and reception of frames with group addresses. The network provides unreliable delivery via multicast service. The interface to the multicast service is AAL specific. The interface to be used is determined by configuration management. |

2.3.2 ATM MAC Entity Service Interface
The ATM MAC entity provides the following service interface to MAC users

| Primitive | Parameters |
|---|---|
| M_UNITDATA.request | destination address<br>source address<br>mac service data unit |
| M_UNITDATA.indication | destination address<br>source address<br>mac service data unit |
| M_REGISTER_ADDRESS | group address |
| M_UNREGISTER_ADDRESS | group address |
| M_REGISTER_ALL | |
| M_UNREGISTER_ALL | |

2.4 ATM Adaptation Layer

The adaptation layers provide transmission and reception of frames on virtual connections. The standard CCITT AAL are used. In this application, AAL 3 is used to denote AAL 3/4 when end systems negotiate the use of the multiplexing identifier. AAL 4 is used to identify AAL 3/4 when the multiplexing identifiers used are specified by the network. IEEE 802.2 LLC will be identified by a value of 1 in the protocol id field of AAL 3/4 frames.

2.5 ATM Signaling Protocol

The ATM LAN signaling protocol contains a subset of the functions in Q.93B. It provides the following services:
- establishment of virtual connections (VCs)
- negotiation of the upper layer protocol (ULP)
- clearing of connections
- dynamic port address assignment
- user to network keep alive

2.6 ATM LAN Server

The ATM LAN server provides configuration and multicast services. It provides operational parameters for each ATM LAN in which each ATM station is configured. Membership in ATM LANs is controlled via policies implemented by the server. These policies may vary between ATM LAN providers. The ATM LAN configuration protocol defines the information provided by stations with which servers may implement policies. Two policies which can be implemented are "port based configuration" and "station based configuration". The ATM LAN server may use the physical cabling to determine LAN membership. This is called "port based configuration". Alternatively, the ATM LAN server may use station MAC addresses to determine LAN membership. This is called "station based configuration". The same station to server protocol is used in either case. The station is not affected by the configuration policies implemented. When requesting ATM LAN configuration parameters, the station always provides its MAC address (es).

Figure 6:
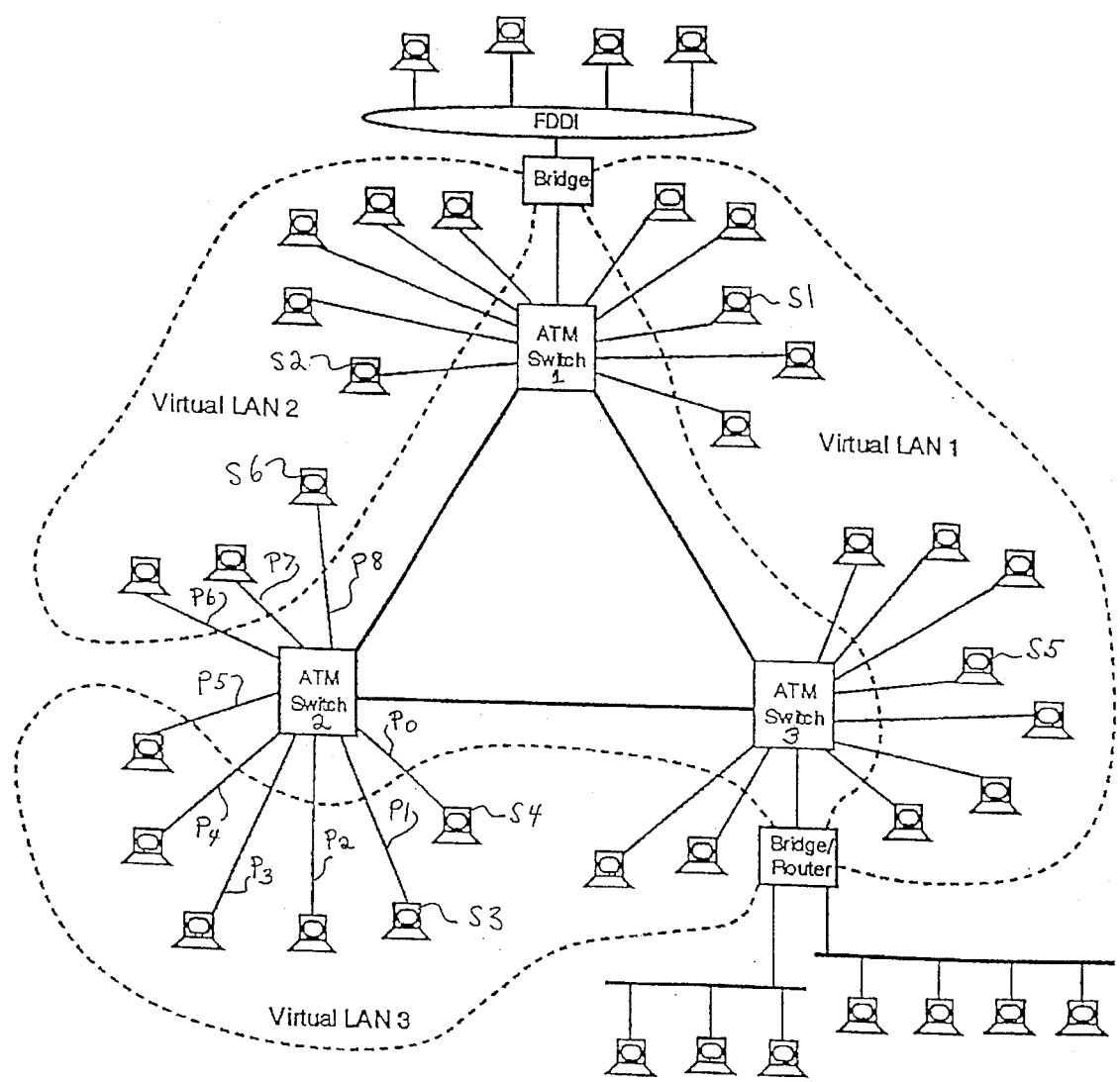
FIG. 6 depicts three ATM LANs configured on a three-switch ATM network.
Figure 7:
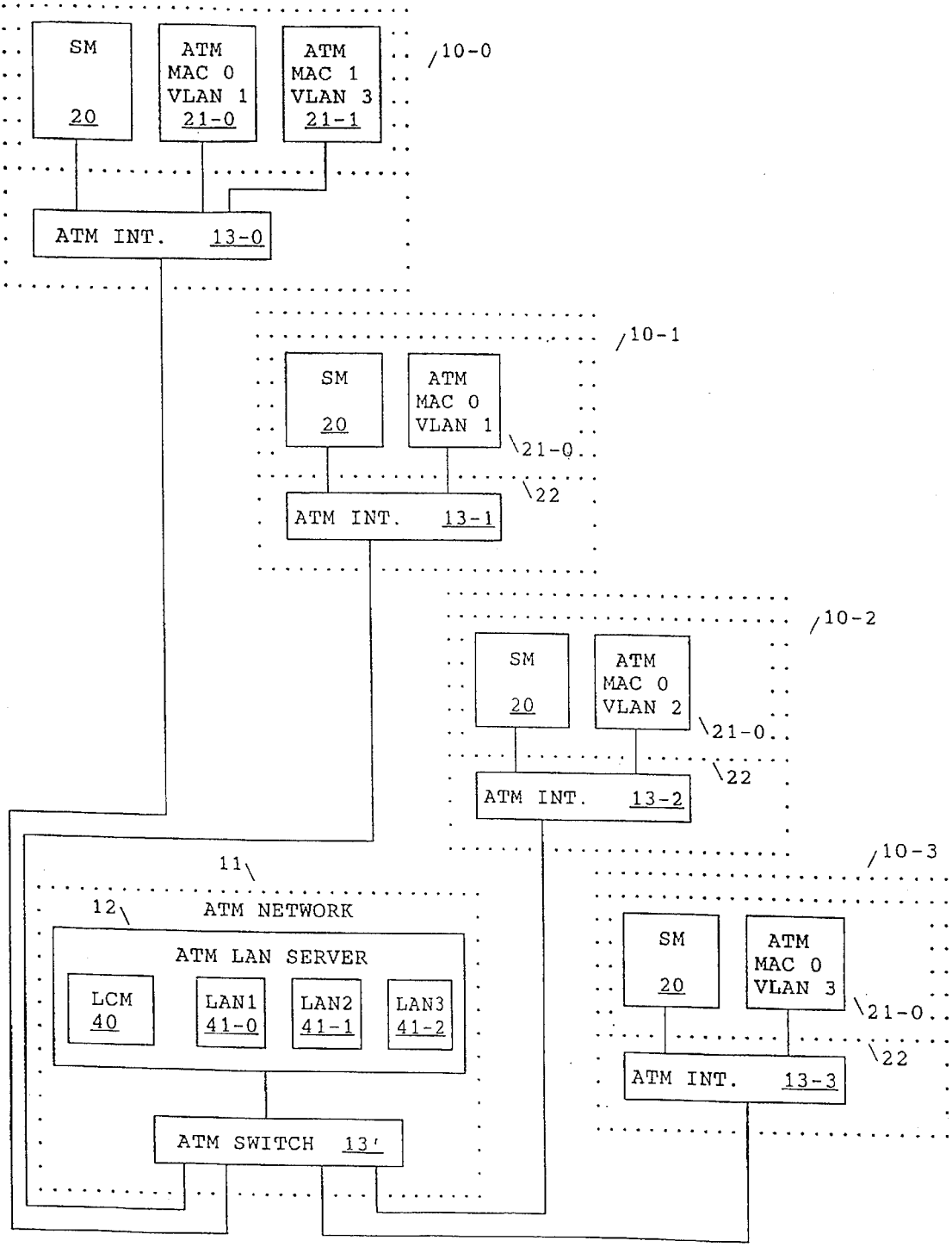
FIG. 7 is a representation of the details of the ATM MACs of stations S0, S1, S2 and S3 from FIG. 6.

The station table shown below is an example of the station-based configuration for the system shown in FIG. 6. The port table shown below is an example of port-based configuration for the system shown in FIG. 6.

| STATION TABLE (VLAN MEMBERSHIP) | |
|---|---|
| VLAN | MAC_ADDRESS |
| VLAN 1 | MAC_Add[0](S1), MAC_Add [1](S1), MAC_Add [5](S5) . . . |
| VLAN 2 | MAC_Add[2](S2), MAC_Add [6](S6) . . . |
| VLAN 3 | MAC_Add[0](S1), MAC_Add [3](S3), MAC_Add [4](S4) . . . |

| PORT TABLE (VLAN ASSOCIATION) | |
|---|---|
| Port Addresses [s/p#] | VLAN |
| PA [2,2], PA [2,3], PA [2,4], PA [2,5] | VLAN [3] |
| PA [2,6], PA [2,7], PA [2,8], PA [2,9] | VLAN [2] |
| . | . |
| . | . |
| . | . |
| PA [2,3], PA [3,4] | VLAN [3] |
| . | . |
| . | . |
| . | . |

Each station establishes a VC to an ATM LAN server for each physical interface. A well known group address is used.

If redundant ATM LAN servers are providing configuration and multicast service, this service is transparent to the ATM station. The servers agree amongst themselves which ones will serve any particular station. The servers may elect to distribute responsibility for multicast service over several servers. This election is transparent to the station.

3 ATM LAN Configuration Management

A station may belong to one or more distinct ATM LANs. The station will then have been configured with one or more MAC entities each having a unique MAC address.

At power-on, the station establishes a VC to the network ATM LAN server. The station ATMMAC sends a configuration enquiry to the ATM LAN server. The enquiry contains the station's MAC address, alan_mac.

```
struct alan_req {  /* configuration request */
    u_char           alan_proto;
    u_char           alan_pdu_type;
    u_short          alan_seqnum;
    struct atm_addr  alan_mac;
};
```

Using the unique MAC address, alan_mac, the ATM LAN server determines the number of ATM LANs configured for that station and the configuration for each connected ATM LAN. A configuration response is sent to the station.

```
struct alan_config {
    u_char            alan_proto;
    u_char            alan_pdu_type;
    u_short           alan_seqnum;
    int               alan_num_lans;
    struct alan_parms alan_lan[ ];
};
```

The configuration response contains one alans_parms per ATM LAN. For each ATM LAN the configuration manager activates an ATM MAC entity. The parameters in the alan_parms element control the configuration parameters of each ATM LAN "tap".

Each ATM LAN 'tap' is described by the following parameters. The alan_config and alan_update messages contain one or more alan_parms structures.

```
struct alan_parms {
    int              alan_version;
    int              alan_aal;
    struct atm_addr  alan_port;
    struct atm_addr  alan_mcast_base;
    struct atm_addr  alan_lan_uid[ ];
    int              alan_num_mcast;
    u_short          alan_mid;
    u_short          alan_mtu;
};
```

The alan_aal parameter specifies which AAL is used for multicast frames. Currently defined values are 4 and 5 for AALs 4 and 5 respectively. The alan_port is the port address from which VCs are setup for this ATM LAN. The ATM LAN server may specify different port addresses for different taps or may specify the same for all. The ATM MAC entity treats this E.164 address as an unstructured bit string.

The ATM LAN manager allocates a range of E.164 group address space for each ATM LAN. The alan_mcast_base is E.164 group address which is used in conjunction with alan_num_mcast (the number of group addresses allocated to the ATM LAN) to map IEEE 802.1 group addresses onto the E.164 group address space. AAL and multicast service parameters are protocol specific.

AAL multicast service requires that multicast AAL PDUs be transmitted using multiplexing identifiers, (MIDs), provided by the ATM LAN server. This allows multicast service to be provided via replication functions often found in ATM switch fabrics. Each ATM MAC entity is assigned a LAN unique MID for transmission and must reassemble AAL using the full 10 bit MID.

Each ATM LAN is assigned a globally unique identifier, alan_lan_uid. This is a 128-bit name created by the ATM LAN server. The ATM LAN server provides alan_parms structures for the requested MAC addresses. If the station requests configuration parameters for two MAC addresses which belong to the same ATM LAN, two identical alan_parms elements are returned.

Once the ATM MAC entities have been created, the configuration manager periodically sends keep alive frames on the configuration SVC. If the configuration SVC is released the configuration manager destroys the ATM LAN entities it created. If after some number of retries the ATM LAN server does not respond to keep alive packets, the configuration manager will release the configuration SVC and destroy ATM MAC entities.

| Configuration Acquisition Protocol State Machine | | | |
|---|---|---|---|
| State | Event | Actions | Newstate |
| Inactive | Activate | Setup Request, Start timer C1 | Wait for Setup Conf |
| Wait for Setup Conf | Release Ind | Setup Request, Start timer C1 | Wait for Setup Conf |
|  | Setup Conf | Config Request, Start Timer C2 | Wait for Setup Conf |
| Wait for Setup Conf | Timeout | Config Request, Increment Retries | Wait for Setup Conf |
|  | Max retries | Release, Setup Request | Wait for Setup Conf |
|  | Config Resp | Activate MAC Entities | Active |
| Any state !Active | Deactivate | Deactive active MAC entities, Release configuration VC | Inactive |
|  | Release Ind | Setup Request, Start timer C1 | Setup Request, Start timer C1 |

4. ATM LAN MAC

The ATM MAC maps IEEE 802.1 flat 48 bit addresses to 60 bit hierarchical E.164 ATM addresses by the address resolution function. Individual IEEE 802. addresses are mapped into port addresses via the ATM Address Resolution Protocol, ATM ARP. Group IEEE 802.1 addresses are mapped to ATM group addresses using a fixed algorithm.

Once an ATM address is determined, the ATM signaling protocol is used to establish a virtual connection. The connection is either a unicast connection or a multicast connection depending upon whether the ATM address is an individual or group address. Connection management is responsible for establishing and clearing these connections.

Once the appropriate connection has been determined for a frame, it is encapsulated in an AAL specific encapsulation method. AAL 4 and AAL 5 have distinct multicast mechanisms due to the limitations of AAL 5.

4.1 Framing

4.1.1 AAL 3/4

ATM LAN uses the same MAC framing as 802.6. ATM LANs use 48 bit MAC addresses to enable interoperability with 802 LANs via MAC bridges. As shown in the following table, addresses are encoded as byte quantities as per 802.6.

| COM PDU HEAD | MCP HEAD | | | | | | CRC 32 |
|---|---|---|---|---|---|---|---|
| | DEST ADR | SOUR ADR | MC BITS | HEAD EXT | LLC | PAD | |
| 4 | 8 | 8 | 4 | 0–20 | 0–9188 | 0–3 | 0,4 |

| COM PDU TRAIL | Prot ID | Pad LEN | QOS Delay | Qos Loss | CRC Ind | Head Ext Len | Bridging (Not Used) |
|---|---|---|---|---|---|---|---|
| 4 | 6 | 2 | 3 | 1 | 1 | 3 | 16 |

4.2 Addresses

Two types of addresses are used in an ATM LAN, station MAC addresses and ATM (or port) addresses. Both types of addresses may either be individual or group addresses.

MAC station addresses identify individual stations connected to an ATM LAN. Station addresses are 48 bit universally administered 802.1 MAC addresses. These MAC addresses enable interoperability with 802.1D LAN MAC bridges. Station addresses are used as MAC frame source or destination addresses.

MAC group addresses are used to address frames to multiple destination stations on an ATM LAN. Group addresses are used to set up virtual connections to multiple destination stations without knowledge of those stations' individual addresses. They are used to provide multicast and broadcast services. Broadcast is a a specific instance of multicast with all stations receiving frames with well defined group address, specifically all 1's. Group addresses are 48 bit universally or locally administered 802. MAC addresses. The group address with all bits set to one is the broadcast address.

ATM Port addresses or port addresses or ATM individual addresses identify physical ports on switches. They are hierarchical 60 bit E.164 addresses dynamically assigned by the network. Each virtual connection has a port address for at least one endpoint. Port addresses are used in ATM ARP and Signaling PDUs.

ATM group addresses (or multicast port addresses) identify an ATM level multicast group. They are used in signaling PDUs.

| Address Type | | Padding | Address |
|---|---|---|---|
| ATM port address | 110x | no padding | 60 bits |
| ATM group address | 111x | no padding | 60 bits |
| MAC station address | 1000 | 12 bits | 48 bits |
| MAC group address | 1000 | 12 bits | 48 bits | x - indicates whether the address is publicly or privately administered

4.3 Multicast Service

4.3.1 Background

Any station on the LAN can register to receive frames addressed to specific group addresses. All stations register to receive frames addressed to group address FFFFFFFFFFFF which is defined to be the broadcast group address. Any station can send frames to any group address without the knowledge of which stations want to receive them.

4.3.2 ATM LAN Multicast

In an ATM LAN, multicast capability is provided by the multicast server which is part of the LAN server. Stations use that service by establishing virtual connections to the server using the multicast base ATM address provided in the configuration parameters (alan__parms). The multicast base address is a privately administered group E.164 address. Virtual connections with a group ATM address at one endpoint are multicast VCs. When setting up a multicast VC the station may request transmit only access so that it will not receive frames transmitted on that VC.

IEEE 802.1 48 bit addressing provides for up to $2^{46}$ possible group addresses all registered by various stations in one LAN. Few ATM networks could support $2^{46}$ virtual connections. To bridge this gap in service offering and network capability, each ATM LAN is configured to support a small (typically 100s) number of multicast circuits. This number is exported in the alan__parms configuration element. Each ATM MAC entity is also provided with a multicast base address which is treated as a 64-bit integer. These two numbers are used to map many 48-bit IEEE group addresses to fewer ATM group addresses which are then used to setup multicast connections. If alan__num__multicast is zero, then the 48-bit group address is added to alan__mcast__base. Otherwise the 48-bit group address is treated as a 16 most significant bits of the 48-bit group address are Exclusive-Ored into the 32 least-significant bits, the result is divided by alan__num__mcast and the resulting remainder is added to alan__mcast__base. In either case, the result value is used as a group address to set up a multicast connection for that group address.

4.3.3 Registering for a Group Address

Each ATM MAC entity maintains a list of group addresses for which its users have requested it receive frames. Each of these group addresses is mapped onto a ATM group address when the MAC entity is given is alan__parms information, that is, when it becomes active. There after, the ATM MAC entity will maintain a multicast connection for each port address derived from the above computations. Note, several MAC group addresses may map onto one group port address. In this case, only one connection is maintained for those MAC group addresses. If the network releases a multicast connection, the ATM MAC entity will re-establish another one.

The ATM MAC entity will always maintain a multicast connection for the group port address derived from the broadcast MAC address.

4.3.4 Transmission of Multicast MAC PDUs

When an ATMMAC entity is presented with a M__UNITDATA.request with a group destination address it maps the group MAC address to the group ATM address, and transmits the MAC PDU on the connection established to that port address. If no connection is already established, the frame is queued until one is established. Multicast connections setup solely for the transmission of multicast PDUs are aged in the same fashion as those setup for unicast PDUs.

4.3.5 Reception of Multicast MAC PDUs

The group destination addresses in received MAC PDUs are checked against the list of registered group addresses. If the group addresses are not registered, the frame is dropped. This dropping is necessary because transmitters may map MAC group addresses onto a multicast connection established to register other group addresses.

All group addressed frames are not received on corresponding multicast connections. Stations listening for multicast frames must be prepared to receive those frames on either the appropriate multicast VC or the broadcast VC.

4.3.6 Unregistering a Group Address

Multicast connections established for registered group addresses are not aged. They are not released until the last MAC service users want to receive frames addressed to any of the group addresses mapped onto that connection.

The ATM MAC entity maintains reference counts on the number of MAC service users which have registered a group address. A reference count on the multicast connection is maintained for each MAC group which maps onto the connections group ATM address.

4.3.7 AAL 4 Multicast Service

Stations connected to multicast VCs can receive frames from many sources simultaneously. The multiplexing identifier (MID) in the ALL4 SAK header is used to correctly reassemble these frames. MIDs are unique within a given ATM LAN. The LAN server assigns a unique MID to each port address.

Up to 1023 stations may be connected to an ATM AAL 3/4 LAN. Each station has a globally unique 48-bit address per ATM LAN. Each station is assigned one MID per ATM LAN (local port address to the station) to be used when transmitting frames on multicast VCs. Stations may not transmit more than one frame simultaneously on multicast VCs with the same local port address. Each station implements MAC level address filtering for frames received on multicast VCs.

Each station has a multicast filter which is used to filter frames received on broadcast VCs. This filter may be implemented in hardware or software. The filter is necessary because each ATM network provides limited multicast service and stations may broadcast unicast frames.

4.3.8 AAL 5 Multicast Service

AAL 5 does not provide for multiplexing frames on a single VC simultaneously. The mid field in the alan_parms structure is ignored. There is no limit on the number of stations (or ATM MACs) which may belong to an AAL 5 ATM LAN.

4.4 ATM Address Resolution Protocol

Individual IEEE 802.1 MAC addresses are mapped into port addresses via the ATM Address Resolution Protocol (ATM ARP). Once the port address is determined the ATM signaling protocol is used to establish a virtual connection.

4.4.1 ATM ARP Operation

Stations connected directly to ATM LANs will, conceptually, have address translation tables to map MAC addresses (both station, and group addresses) into virtual connection identifiers. The MAC-to-port table, provides mappings from MAC addresses to port addresses.

The MAC transmission function accesses this table to get next hop port address given destination station address. This table is updated when new station address to port address mappings are learned via ATM ARP and when MAC group address to ATM group address mappings are computed. The entries in the MAC to port table are updated when ATM ARP requests and replies are received.

When the MAC layer is presented with a frame for transmission, it looks up the destination address in the station to port address table. If an entry is found, connection management selects the appropriate virtual connection upon which the frame should be transmitted.

If no entry is found, a new entry is allocated for that MAC address. If the MAC address is a group address, an ATM group address is computed using an AAL specific function. This operation permits the broadcast VC to be established without sending ATM ARP requests. Mapping individual MAC addresses to port addresses is accomplished by broadcasting an ATM ARP request for the MAC addresses to all stations connected to the ATM LAN. The ATM ARP request carries the senders MAC and port address mapping. All stations receive the request. The station with the specified MAC address responds with an ATM ARP reply. The responder updates its MAC-to-port table using the information in the request. The reply carries both the responders' and the requestors MAC and port addresses. When the requestor receives the ATM ARP reply, it updates its port-to-MAC address table.

| MAC to Port entry | | |
|---|---|---|
| Station Address 48 Bit 802.1 MAC | Next Hop Port Address E.164 | Status |

The requesting station must transmit MAC frames on broadcast connections until it receives responses to its ATM ARP requests. It may then set up a connection using the port address in the reply. Usually, the responder sets up the connection before replying.

The ATM ARP function times out entries in the MAC-to-port table when they have been idle for some time. Connection management is notified when entries in the MAC-to-port table are added, updated or deleted. Connection management notifies ATM ARP when connections are established and released. Entries in this table are deleted when an SVC establishment to the port address fails. They are deleted when the connection corresponding to an entry is released.

TABLE 5

| Port to VPI-VCI entry | | | |
|---|---|---|---|
| Local Port Address | Peer Port Address | QOS | VPI/VCI |

4.4.2 ATM ARP PDUs

ATM ARP requests and replies are encapsulated in 802.2 LLC and the appropriate AAL for the connection upon which they are sent. ATM ARP requests are always broadcast. Therefore they are encapsulated in the AAL used for multicast connections. ATM ARP replies are usually sent on point to point connections. The ATM MACs negotiate the AAL to be used for that connection. The reply is then encapsulated in 802.2 LLC and the specific AAL framing.

The ATM ARP messages are:

```
/*
 * ATM Address Resolution Protocol.
 */
struct atm_arp {
        u_short         aa_llp; /* lower layer protocol */
        u_short         aa_ulp; /* upper layer protocol */
        u_char          aa_llp_len;
        u_char          aa_ulp_len;
        u_short         aa_msg_type;
        u_char          aa_sender_port[8];
        u_char          aa_sender_mac[6];
        u_char          aa_target_port[8];
        u_char          aa_target_mac[6];
};
/* aa_msg_type' s */
#define ATM_ARP_REQUEST 1
#define ATM_ARP_REPLY   2
```

The aa_ulp_len and aa_llp_len fields are always 6 and 8 respectively. The aa_ulp field is set to 16. The sender mac and port addresses are set to the sender's Mac and Port addresses for request and non-proxy reply messages. The aa_send_mac field in proxy replies contains the aa_target_mac from the corresponding request. The aa_target_mac is always set to the Mac address needing resolution in requests and it is set to the requestor's Mac address in replies. The aa_target_port is undefined in requests and in replies it contains the aa_sender_port from the corresponding request. The recipient of a reply verifies that the aa_target_port corresponds to one of its own port addresses.

4.5 Connection Management

Once a MAC address has been resolved to a ATM address a connection to the station receiving frames for that MAC address can be set up and those frames can be transmitted directly to that station rather than broadcast. Connection management is responsible for defining the connection establishment and release policies. The ATM signaling protocol is used to establish connections for ATM LAN MAC frames. A specific upper layer protocol identifier is reserved for ATM LAN MAC frames.

4.5.1 Connect Establishment

Connections are established when an Unacknowledged Data Request needs to be transmitted to a MAC address for which a to-ATM address mapping is known, but no connection to that ATM address, is established (or emerging). It is possible for two MAC entities to simultaneously establish connections to each other. When connection management receives connection setup SDU from ATM signaling, it checks to see if a connection to the peer port address already exists. If another connection exists (or is being established), the connection initiated from the lower port address is released. Thus there will never be more than one connection established between two ATM MAC entities.

While a connection is being setup, frames which would be transmitted on that connection once it is established must be queued or dropped. Frames should not be broadcast. At least one frame must be queued. Implementations may chose to queue more. Once the connection is set up, any queued frames are transmitted. The first frame transmitted on a connection initiated by a station must be the ATM ARP response for the an ATM ARP request.

4.5.2 Quality of Service

Currently, distinct qualities of service may be defined for ATM MAC PDUS.

4.5.3 Connection Release

Connections for which there is no MAC-to-ATM address mapping are held for the product of the number of ATM ARP retries and retry interval and then released. The MAC-to-ATM address mappings are aged separately.

When ATM ARP deletes all the translations to a specific ATM address, all connections to that ATM address are released.

When a connection is released, the ATM ARP function deletes all MAC to ATM translations for that connection's remote ATM address.

4.6 Frame Reception

Frame Reception Stations are responsible for performing filtering of incoming frames. Unicast addressed frames for other stations will be received on the broadcast VC. Multicast frames for unregistered multicast addresses may be received on multicast VCs. These frames are not passed up to the MAC service user.

4.7 Address Resolution and Connection Establishment Example

In this example, the steps are described that are required for one station, called Lyra, to deliver a MAC UNITDATA SDU to another station, called Altera, assuming neither station has had any prior communication. It is assumed that both stations are part of the same ATM LAN. These steps are only required for the initial transmission from Lyra to Altera. Additional MAC PDUs may be transmitted on the connection setup by these steps until either station decides it no longer wishes to maintain the connection. In this example, MAC addresses are expressed in xx:xx:xx:xx:xx:xx form where each pair of hex digits, xx, is one octet for the address. Port addressees are expressed in the same form except that they have 8 octets.

- An ATM MAC service user on Lyra provides the ATM MAC with an UNITDATA SDU to be sent to station address 00:80:b2:e0:00:60. The MAC consults its MAC to port address table, but finds no translation.
- The MAC creates an ATM ARP request for MAC address 00:80:b2:e0:00:60. The request contains Lyra's own MAC and port addresses, 00:80:b2:e0:00:50 and d1:41:57:80:77:68:00:02 respectively. The ATM ARP is encapsulated in LLC/SNAP. The destination MAC address is ff:ff:ff:ff:ff:ff (the broadcast address). The ATM MAC recursively invokes itself to transmit the ATM ARP request.
- The MAC address to port address table is searched for the broadcast MAC address and the corresponding port address is obtained, f1:41:57:80:77:68:01:01. The station established a connection to this port address when the ATM LAN MAC entered the active state. The ATM ARP PDU is encapsulated in an 802.6 frame and passed to the AAL 4 function along with the MID associated with this ATM MAC entity for transmission of that multicast connection.
- The MAC must transmit the MAC SDU. In lieu of a valid MAC address to port address mapping the broadcast MAC to port mapping and associated connection are used. The MAC SDU is encapsulated in an 802.6 frame and passed to the AAL 4 function with the MID associated with this ATM MAC entity for transmission of that multicast connection.

All the above took place on Lyra. The subsequent steps take place on Altera as it receives the ATM ARP and the ATM MAC PDU containing user data.

The ATM ARP is received by all MAC entities including Altera. The other MACs determine that the requested MAC address is not theirs and ignore the request. Altera determines that its MAC address is in the request. Altera updates its MAC to port address table with Lyra's MAC and port addresses provided in the ATM ARP request. Next an ATM ARP reply is constructed using Altera's port and MAC addresses. This request, in the form of an MAC SDU with Lyra's MAC address as the destination, is passed to the ATM MAC entity.

The ATM MAC looks up Lyra's MAC address in the MAC to port address table. It finds Lyra's port address. The port to VCI table is searched using that port address. No entry is found. Connection management is invoked to establish a connection to Lyra. Connection management passes a SETUP request to ATM signaling. The MAC queues the ATM ARP response until the connection is established.

Altera ATM signaling module sends a SETUP PDU to establish a connection to port address d1:41:57:80:77:68:00:02. The upper layer protocol (sometimes called upper layer compatibility) is the ATM LAN MAC. (This is not a function of the ATM MAC. But it is included for illustrative purposes.)

Next all stations receive the MAC SDU containing the user data on the broadcast connection. All stations except Altera determine that the destination MAC address is not theirs and drop the frame. Altera accepts the frame strips off the 802.6 and LLC/SNAP overhead and passes the frame up to the user function identified by LLC/SNAP.

At this time, the SDU provided to Lyra's ATM MAC has been delivered to the appropriate MAC user on Altera. However, the MAC entities continue connection establishment and address resolution for subsequent communications between the two stations. The next sequence of operations occurs on Lyra.

ATM signaling on Lyra receives a connection setup indication from the network. This indication is passed up to the upper layer protocol which in this instance is the ATM MAC.

The ATM MAC receives a setup indication SDU from signaling. At this point Lyra knows some other station's ATM MAC is trying to setup a connection to it. The port to vci table is searched for a connection to the callers port address. In this case none is found. The connection is accepted by passing a CONNECT SDU to ATM signaling. The MAC starts an idle timer for the connection. Note, that the ATM MAC can not use this connection until an ATM ARP request or response is received indicating MAC addresses for stations accessible via the connection.

Lyra's ATM signaling transmits a CONNECT PDU to the network. Typically, network communication is bi-directional. Assuming this is the case the MAC service user on Altera has responded to the MAC SDU indication with a MAC SDU request,. The following actions take place on Altera. The ordering of the arrival of MAC SDU and the CONNECT SDU are arbitrary.

The MAC service user passed the ATMMAC an SDU with a destination MAC address of 00:80:b2:e0:00:50 (Lyra's). The MAC finds the mapping from MAC address to port address learned when the ATM ARP request was received from Lyra. The MAC next finds that it is setting up a connection to Lyra's port address and that the connection is not yet established. A MAC PDU is created from the MAC SDU and queued waiting connection establishment.

Altera ATM signaling receives a connect PDU. This is passed up to the MAC as a SETUP confirmation. The ATM signaling sends a CONNECT acknowledge PDU to Lyra. The connection is considered established.

Altera's ATM MAC, upon receiving the SETUP confirmation, transmits all frames which were queued awaiting connection establishment. The ATM ARP reply is the first frame to transmitted. It is followed by the MAC PDU containing user data.

At this TIME, address resolution and connection are complete on Altera. Any further frames addressed to Lyra's MAC address will use the new connection. The connection is not established on Lyra. Also Lyra still does not have a mapping for Altera's MAC address. The following actions complete address resolution and connection establishment on Altera.

The ATM ARP reply is received on the connection which is still being setup. (Note most ATM networks have slower signaling channels than payload channels. Typically the ATM ARP response will be received prior to the CONNECT acknowledge PDU.)

The MAC enters Lyra's MAC address to port address mapping in the MAC to port table. At this point any MAC UNIT-DATA requests will be queued until the SETUP complete indication for the connection is passed up from ATM signaling.

The MAC PDU containing user data from Lyra's MAC users is received. The 802.6, LLC and SNAP headers are removed and a MAC UNITDATA indication is passed up to the appropriate MAC service user.

Altera's ATM signaling receives a CONNECT_ACK PDU. This moves the connection into established state. The ATM signaling function passes up a SETUP COMPLETE indication informing the ATM MAC it may transmit on the connection. Connection management starts its idle timer for the connection.

The connection is now established on both stations. One or more MAC UNITDATA SDUs have been delivered. The connection will timed out as per local policy decisions.

ATM LAN Code Overview

One detailed embodiment of computer software code used in connection with the present invention appears in the VIRTUAL NETWORK USING ASYNCHRONOUS TRANSFER MODE APPENDIX of U.S. Pat. No. 5,444,702.

The ATM LAN MAC code in the appendix is organized by functional components and Operating System (OS) dependencies. The file if_atm.c contains the routines which contain OS dependencies and which are typically implemented differently for each OS. The unicast unit 25 and multicast unit 24 address resolution functions are implemented in the file atmarp.c. The file atmarp.h contains the definitions for the ATM ARP protocol and the structures used by atmarp.c to implement the protocol. The file atm.c implements the function of connection management unit 27. Those routines interact with the ATM signaling function to establish and release connections. The framing unit 26 function is implemented in the OS specific file if_niu.c in the routines niuoutput(), atm_mac_input() which encapsulate and decapsulate frames respectively. The station management unit 28 functions are implmenented in atm_init.c and in parts of the ATM signaling unit 28 in the files svc.c, svc_utl.c and svc_pdu.c. The ATM LAN server unit 12 functions are implemented in the files lm.c, lm_cfg.c, lm_mgmt.c and lm_util.c.

In the APPENDIX of U.S. Pat. No. 5,444,702 the configuration management units 20 and 40 are implemented in an alternate embodiment wherein the operational unit 28 PDUs rather than in a switched VCs as previously described.

While the invention has been particularly shown and described with reference to preferred embodiments thereof it will be understood by those skilled in the art that various changes in form and details may be made therein without departing from the spirit and scope of the invention.

We claim:

1. For a communication system including a plurality of ports where each port has a unique port address, where sending ports have sending port addresses, and where receiving ports have receiving port addresses, and where the communication system includes a plurality of stations where each station has, a unique station address distinguishing the station from other stations, a connection to one of said ports for communications between source stations at the sending ports and destination stations at the receiving ports, packet means for providing packets for transferring information, said information including a destination station address for addressing one or a group of said destination stations, and packet converter means connected to said packet means for converting between packets and cells for transfers between stations;

an apparatus comprising:

connection means for connecting said sending ports to said receiving ports, address resolution means for determining a particular one or more of said receiving port addresses corresponding to said destination station address, said address resolution means including multicast means for multicasting said destination station address from a particular one of said source stations to a group of said destination stations, said multicast means including, response means for providing said particular one or more of said receiving port addresses corresponding to said destination station address, and reply means for transmitting said particular one or more of said receiving port addresses to a sending port; and connection management means connected to receive said one or more receiving port addresses from said address resolution means for requesting connections through said networking apparatus connecting said sending ports to said receiving ports whereby packets are transferred from source stations to destination stations by cell transfers.

2. In the system of claim 1 wherein said connection means includes means for connecting a sending port to many receiving ports.

3. In the system of claim 1 wherein said management means includes means for transferring configuration parameters between stations and said connection means.

4. In the system of claim 3 wherein said management means includes means for transferring multicast configuration parameters between stations and said connection means.

5. In the system of claim 1 wherein said management means includes means for transferring unicast configuration parameters between stations.

6. In the system of claim 1 wherein said connection means includes a single ATM switch.

7. In the system of claim 1 wherein said destination station address corresponds to a particular destination station of said group of said destination stations and wherein said reply means includes, means for establishing a port-to-port connection between said particular destination station at a receiving port and said particular one of said source stations at a sending port.

8. In the system of claim 1 wherein, in said multicast means, said response means provides one of said particular one or more of said receiving port addresses for a particular destination station having said destination station address, said reply means establishes a port-to-port connection between said particular destination station at a receiving port and said particular one of said source stations at a sending port, and said management means includes means for transmitting cells between said particular one of said source stations and said particular destination station over said port-to-port connection.

9. For a communication system including a plurality of ports, including sending ports and receiving ports, where each port has a unique port address, where sending ports have sending port addresses and receiving ports have receiving port addresses, and including a plurality of stations where each station has, a unique station address distinguishing the station from other stations, a connection for an ATM network at one of said ports whereby source stations at the sending ports communicate with destination stations at the receiving ports, packet means for providing packets for transferring information where the information includes a destination station address for addressing one or a group of said destination stations, packet converter means connected to said packet means for converting between packets and cells for transfers between stations, an apparatus comprising:

one or more ATM switches for connecting said sending ports to said receiving ports for communications through said one or more ATM switches to form the ATM network, address resolution means for determining a particular one of said receiving port addresses corresponding to said destination station address, said address resolution means including multicast means for multicasting said destination station address from a particular one of said source stations to a group of said destination stations, wherein said group of destination stations that receive the multicast destination station address constitutes a local network, connection management means connected to receive said particular one of said receiving port addresses from said address resolution means for requesting connections through said ATM network connecting said sending ports to said receiving ports whereby packets are transferred from source stations to destination stations by cell transfers through said ATM network, local network management means for controlling which of said stations are included within said group of destination stations that receive the multicast destination station address.

10. In the system of claim 9 wherein said local network management means includes a station table for storing station addresses for indicating which of said stations are included within the local network.

11. In the system of claim 10 wherein said local network management means includes, means for adding and deleting a station address to said station table for adding and deleting, respectively, a station to and from the local network.

12. In the system of claim 9 wherein each particular station of said group of said destination stations includes, means for communicating with said local network management means for communicating that said particular station is included in said local network.

13. In the system of claim 9 wherein said local network management means includes a port table for indicating ports for said group of destination stations that constitute the local network.

14. In the system of claim 13 wherein local network management means includes, means for adding and deleting a port address to said port table for indicating additions and deletions respectively, of said ports.

15. For a communication system including a plurality of ports, including sending ports and receiving ports, where each port has a unique port address, where sending ports have sending port addresses and receiving ports have receiving port addresses, and including a plurality of stations where each station has, a unique station address distinguishing the station from other stations, a connection for an ATM network at one of said ports whereby source stations at the sending ports communicate with destination stations at the receiving ports, packet means for providing packets for transferring information where the information includes a destination station address for addressing one or a group of said destination stations, packet converter means connected to said packet means for converting between packets and cells for transfers between stations, an apparatus comprising:

one or more ATM switches for connecting said sending ports to said receiving ports for communications through said one or more ATM switches to form the ATM network, identification means for identifying a plurality of groups of stations, each group constituting a local network of the stations in the group, address resolution means for determining a particular one or more of said receiving port addresses corresponding to said destination station address, said address resolution means including multicast means for multicasting said destination station address from a particular one of said source stations to a group of stations constituting a local network including the source station identified by said identification means, wherein said multicast means includes, response means for providing said particular one or more of said receiving port addresses corresponding to said destination station address, reply means for transmitting said particular one or more of said receiving port addresses to a sending port through said ATM network, connection management means connected to receive said receiving port addresses from said address resolution means for requesting connections through said ATM network to connect said sending ports to said receiving ports whereby packets are transferred from source stations to destination stations by cell transfers through said ATM network.

16. In the system of claim 15 wherein said networking apparatus includes means for connecting a sending port to many receiving ports.

17. In the system of claim 15 wherein said management means includes means for transferring configuration parameters between stations and said ATM network.

18. In the system of claim 15 wherein said management means includes means for transferring multicast configuration parameters between stations and said ATM network.

19. In the system of claim 15 wherein said management means includes means for transferring unicast configuration parameters between stations.

20. In the system of claim 15 wherein said said one or more ATM switches comprises a single ATM switch.

21. In the system of claim 15 wherein said destination station address corresponds to a particular destination station of said group of stations including the source station and wherein said reply means includes, means for establishing a port-to-port connection between said particular destination station at a receiving port and said particular one of said source stations at a sending port.

22. In the system of claim 15 wherein, in said multicast means, said response means provides one of said particular one or more of said receiving port addresses for a particular destination station having said destination station address, said reply means establishes a port-to-port connection between said particular destination station at a receiving port and said particular one of said source stations at a sending port, and said connection means includes means for transmitting cells between said particular one of said source stations and said particular destination station over said port-to-port connection.

23. In the system of claim 15 wherein said apparatus includes, local network management means for controlling which of said stations are included within each of said groups of stations constituting a local network.

24. In the system of claim 23 wherein said local network management means includes a port table for indicating ports for stations that are included within each of said groups of stations constituting a local network.

25. In the system of claim 24 wherein said local network management means includes, means for adding and deleting a port address to said port table.

26. In the system of claim 15 wherein said apparatus includes, local network management means for transmitting said one or more receiving port addresses corresponding to said destination station address for each of the stations in each of said groups of stations constituting a local network.

27. In the system of claim 26 wherein said local network management means includes station table means for storing station addresses for indicating which stations are included within each of said groups of stations constituting a local network.

28. In the system of claim 27 wherein said local network management means includes,
- means for adding and deleting station addresses to said station table means and thereby for indicating additions and deletions respectively, of stations to and from the groups of stations constituting a local network.

29. In the system of claim 28 wherein said local network management means includes,
- means for adding and deleting a station address to said station table means and thereby for indicating additions and deletions respectively, of one or more stations to and from a plurality of said groups of stations constituting a local network.

30. In the system of claim 29 wherein each station includes,
- means for communicating with said local network management means for communicating ones of said groups of stations constituting a local network with which the station is associated.

31. In the system of claim 29 wherein each station has a physical connection to a pert of said ATM network and wherein said means for adding and deleting operates independently of the physical connection of each station.

32. In the system of claim 27 wherein said station table means stores a particular one of said station addresses corresponding to a particular one of said stations to establish associations with a particular two or more of said groups of stations constituting a local network to indicate that said particular one of said stations is logically in each of said particular two or more of said groups of stations constituting a local network.

33. In the system of claim 32 wherein said particular one of said stations is a bridge station connecting between said particular two of said groups of stations constituting a local network.

34. In the system of claim 32 wherein said particular one of said stations is a router station connecting between said particular two of said groups of stations constituting a local network.

* * * * *